US012725219B2

(12) United States Patent
Kim et al.

(10) Patent No.: US 12,725,219 B2
(45) Date of Patent: Sep. 1, 2026

(54) TEST HANDLER FOR GRAPHICS CHIP

(71) Applicants: MIRAE Corporation, Cheonan-si (KR); SK HYNIX INC., Icheon-si (KR)

(72) Inventors: Kyung Tae Kim, Suwon-si (KR); Sung Yong Yu, Cheonan-si (KR); Ung-Hyun Yoo, Suwon-si (KR); Kuk-Hyung Lee, Suwon-si (KR); Seok Heo, Icheon-si (KR); Chang Hoon Baek, Icheon-si (KR)

(73) Assignees: MIRAE Corporation, Cheonan-si (KR); SK HYNIX INC., Icheon-si (KR)

( * ) Notice: Subject to any disclaimer, the term of this patent is extended or adjusted under 35 U.S.C. 154(b) by 135 days.

(21) Appl. No.: 18/762,859

(22) Filed: Jul. 3, 2024

(65) Prior Publication Data

US 2025/0029200 A1 Jan. 23, 2025

(30) Foreign Application Priority Data

Jul. 17, 2023 (KR) ........................ 10-2023-0092453

(51) Int. Cl.
*G06T 1/20* (2006.01)
*G06F 11/22* (2006.01)

(52) U.S. Cl.
CPC ............ *G06T 1/20* (2013.01); *G06F 11/2236* (2013.01); *G06T 2200/28* (2013.01)

(58) Field of Classification Search
CPC .... G06T 1/20; G06T 2200/28; G06F 11/2236
See application file for complete search history.

(56) References Cited

U.S. PATENT DOCUMENTS 3,969,229 A * 7/1976 Homer .................... B07C 5/344 250/224
2009/0167294 A1* 7/2009 Beom ................ G01R 31/2893 324/757.01
2009/0237089 A1* 9/2009 Cho .................. G01R 31/2893 324/555
2015/0066414 A1* 3/2015 Ouyang ............ G01R 31/2894 702/117

(Continued)

FOREIGN PATENT DOCUMENTS

GB 2235581 B * 6/1993 ......... G01R 31/2893
KR 10-2004-0056680 A 7/2004

(Continued)

*Primary Examiner* — Ashish Thomas
*Assistant Examiner* — Indranil Chowdhury
(74) *Attorney, Agent, or Firm* — Harness, Dickey & Pierce, P.L.C.

(57) ABSTRACT

The present invention relates to a test handler for graphics chip including a loading unit performing a loading process of loading a graphics chip which is to be tested, an unloading unit performing an unloading process of unloading a tested graphics chip, a test unit testing the graphics chip which is to be tested, a buffer unit transferring a graphics chip between the loading unit and the test unit and transferring a graphics chip between the unloading unit and the test unit, wherein the test unit includes a commercial graphics card which is the same as a practically used graphics card and a contact unit connecting the commercial graphics card to the graphics chip which is to be tested.

17 Claims, 14 Drawing Sheets

(56) References Cited

U.S. PATENT DOCUMENTS

| | | | | |
|---|---|---|---|---|
| 2023/0160949 A1* | 5/2023 | Schuster | G01R 31/2868 | |
| | | | 324/762.01 | |
| 2023/0253226 A1* | 8/2023 | Chang | H01L 21/67333 | |
| | | | 324/757.04 | |
| 2025/0189577 A1* | 6/2025 | Lee | G01R 31/2887 | |
| 2025/0283936 A1* | 9/2025 | Ko | G01R 31/2863 | |
| 2025/0370036 A1* | 12/2025 | Lee | G01R 31/2893 | |
| 2026/0050008 A1* | 2/2026 | Kim | G01R 1/0466 | |
| 2026/0050027 A1* | 2/2026 | Kim | G01R 31/2601 | |

FOREIGN PATENT DOCUMENTS

| | | | | |
|---|---|---|---|---|
| KR | 20040056680 A * | 7/2004 | G11C 5/04 | |
| KR | 10-2023-0019757 A | 2/2023 | | |
| KR | 20230019757 A * | 2/2023 | G01R 31/2867 | |
| MY | 172198 A * | 11/2019 | G01R 31/26 | |
| MY | 199907 A * | 11/2023 | G01R 31/2867 | |
| WO | WO-2019245354 A1 * | 12/2019 | H01L 21/67 | |

* cited by examiner

TEST HANDLER FOR GRAPHICS CHIP

CROSS-REFERENCE TO RELATED APPLICATIONS

This application claims the benefit of the Korean Patent Application No. 10-2023-0092453 filed on Jul. 17, 2023, which is hereby incorporated by reference as if fully set forth herein.

FIELD

The present invention relates to a test handler for graphics chip, which tests a chip equipped in a graphics card to classify by classes.

BACKGROUND

Chips equipped in a graphics card (hereinafter referred to as a graphics chip) are manufactured through various processes. For example, graphics chips undergo various processes which classify graphics chips by classes through a test process by using handler equipment such as a test handler.

The test handler performs a loading process, a test process, and an unloading process on a graphics chip. The loading process is a process of loading a graphics chip from a user tray into a test unit. The test process is a process of connecting a graphics chip, accommodated into a test tray, to the test unit by using the test handler. The test unit performs a certain test on the graphics chip. The unloading process is a process of unloading the graphics chip from the test unit into the user tray. In this case, the test handler classifies graphics chips by classes, based on a test result.

A test handler for graphics chip according to the related art has been implemented to connect a graphics chip to a test graphics card replicated from a practically used graphics card (hereinafter referred to as a 'commercial graphics card') to perform a test process on the graphics chip. Therefore, in a case where a graphics chip tested by the test handler for graphics chip according to the related art is equipped in a commercial graphics card and used, there is a problem where the real performance of a graphics chip has a difference with a test result based on a test process.

SUMMARY

The present invention is directed to providing a test handler for graphics chip, which may decrease a performance deviation between the performance of a graphics chip based on a test result and the performance of a graphics chip in a case where a graphics chip is equipped in a commercial graphics card and used.

To accomplish the above-described objects, the present invention may include the following elements.

The present invention may provide a test handler for graphics chip including: a loading unit performing a loading process of loading a graphics chip which is to be tested; an unloading unit performing an unloading process of unloading a tested graphics chip; a test unit testing the graphics chip which is to be tested; a buffer unit transferring a graphics chip between the loading unit and the test unit and transferring a graphics chip between the unloading unit and the test unit. The test unit may include a commercial graphics card which is the same as a practically used graphics card and a contact unit connecting the commercial graphics card to the graphics chip which is to be tested.

DETAILED DESCRIPTION

Hereinafter, an embodiment of a test handler for graphics chip according to the present invention will be described in detail with reference to the accompanying drawings.

Figure 1:
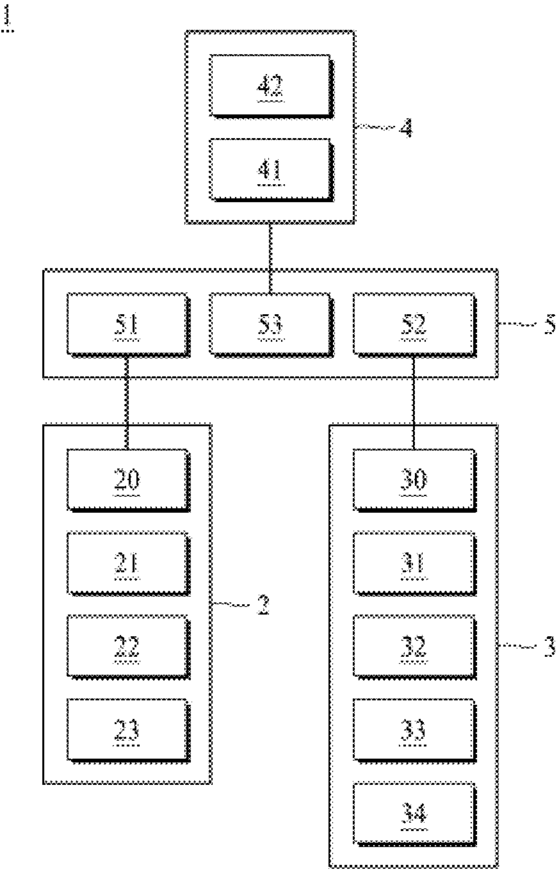
FIG. 1 is a schematic block diagram of a test handler for graphics chip according to the present invention.
Figure 2:
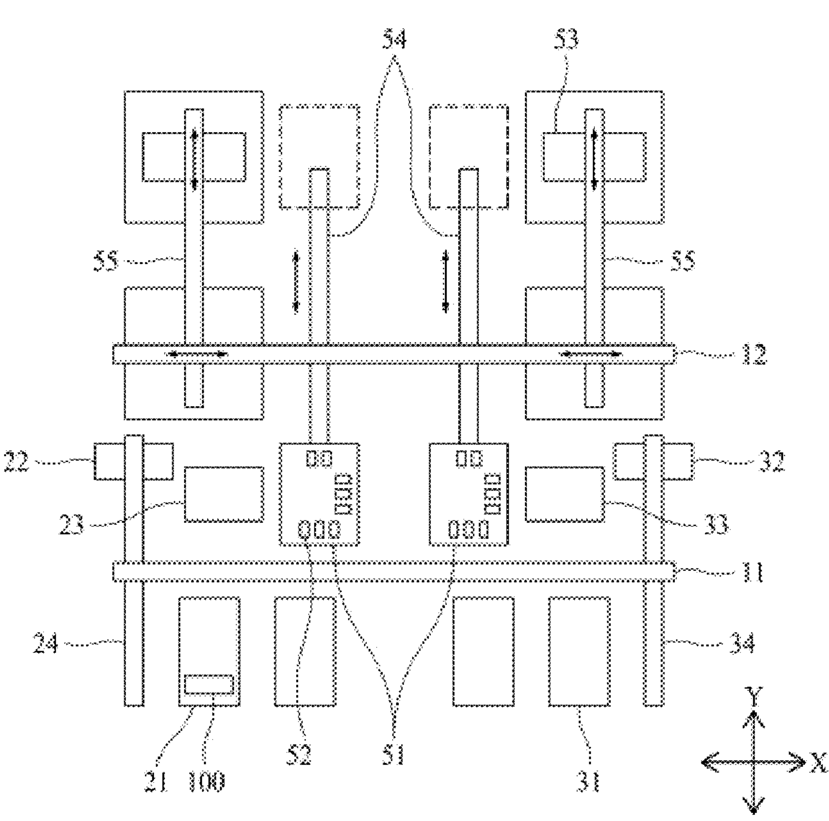
FIG. 2 is a schematic plan view of a test handler for graphics chip according to the present invention.

Referring to FIGS. 1 and 2, a test handler 1 for graphics chip according to the present invention is for testing a graphics chip 10 equipped in a graphics card and classifying the graphics chip 10 by classes, based on a test result.

The test handler 1 for graphics chip according to the present invention may include a loading unit 2 which performs a loading process of loading the graphics chip 10 which is to be tested, an unloading unit 3 which performs an unloading process of unloading a tested graphics chip 10, a test unit 4 which tests the graphics chip 10 which is to be tested, and a buffer unit 5 which transfers the graphics chip 10 between the loading unit 2 and the test unit 4 and transfers the graphics chip 10 between the unloading unit 3 and the test unit 4. The test unit 4 may include a commercial graphics card 41 which is the same as a practically used graphics card and a contact unit 42 which connects the commercial graphics card 41 to the graphics chip 10 which is to be tested. Therefore, the test handler 1 for graphics chip according to the present invention may perform a test on the graphics chip 10 by using the same commercial graphics card 41 as a practically used graphics card and the contact unit 42. Accordingly, the test handler 1 for graphics chip according to the present invention may perform a test in the same environment as a practically used environment, and thus, may decrease a performance deviation between the performance of the graphics chip 10 based on the test result and the performance of the graphics chip 10 in a case where the graphics chip 10 is equipped in the commercial graphics card 41 and used.

Figure 5:
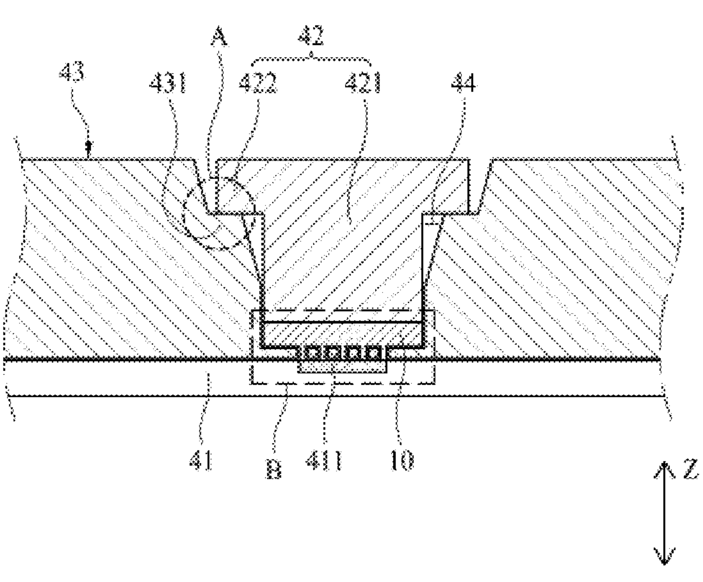
FIG. 5 is a schematic cross-sectional view of a test unit in a test handler for graphics chip according to the present invention.
Figure 6:
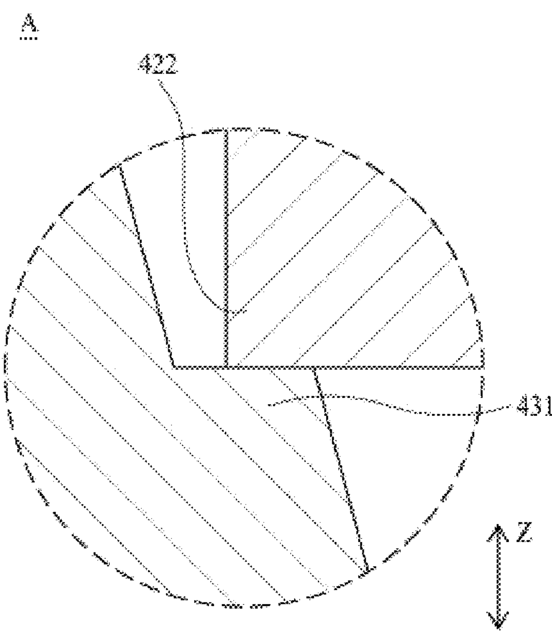
FIG. 6 is an enlarged view of a portion A of FIG. 5.
Figure 7:
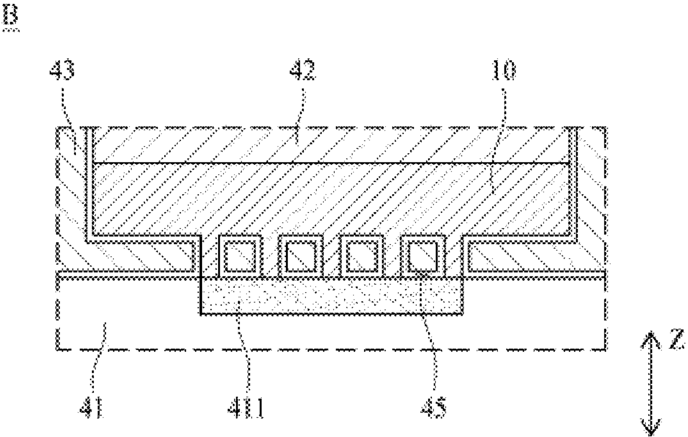
FIG. 7 is an enlarged view of a portion B of FIG. 5.
Figure 8:
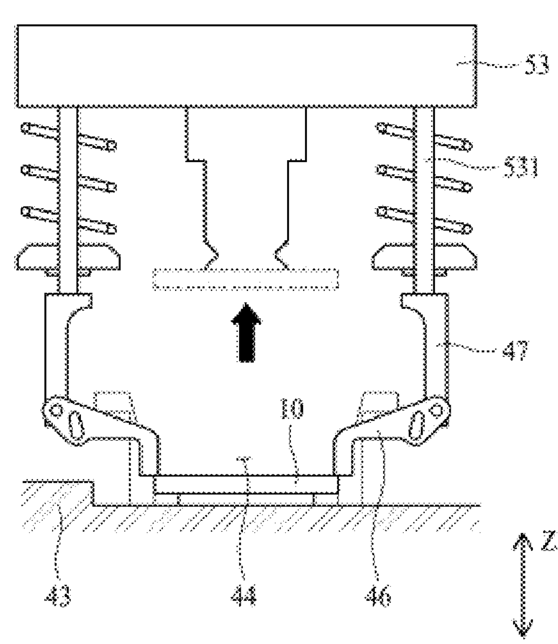
FIG. 8 is a schematic cross-sectional view illustrating an example where an opening/closing unit of a test picker is disposed at a closing position in a test handler for graphics chip according to the present invention.
Figure 9:
FIG. 9 is a schematic cross-sectional view illustrating an example where an opening/closing unit of a test picker is disposed at an opening position in a test handler for graphics chip according to the present invention.
Figure 9:
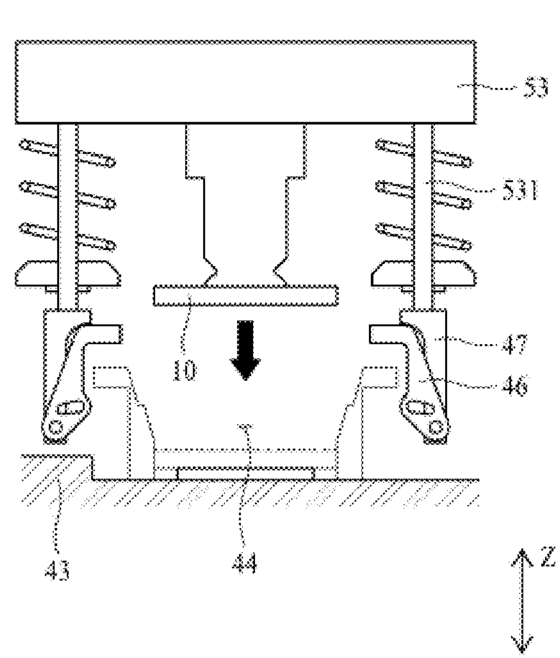
Figure 10:
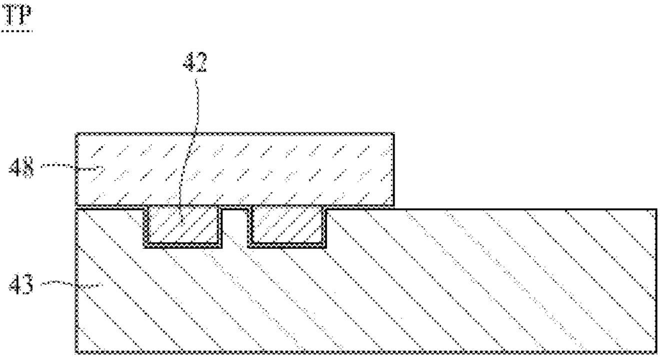
FIG. 10 is a schematic cross-sectional view illustrating an example where a movement unit is disposed at a contact position in a test handler for graphics chip according to the present invention.
Figure 11:
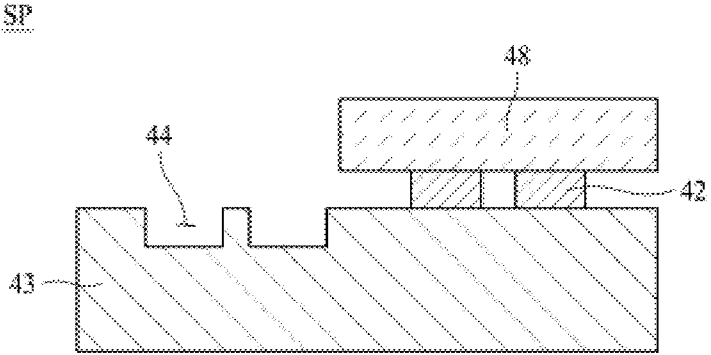
FIG. 11 is a schematic cross-sectional view illustrating an example where a movement unit is disposed at a standby position in a test handler for graphics chip according to the present invention.
Figure 12:
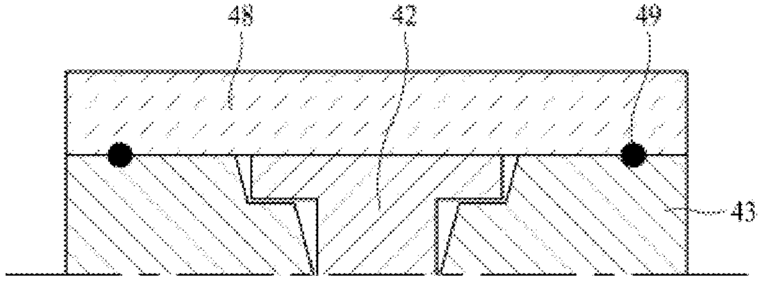
FIG. 12 is a schematic cross-sectional view of a sealing member disposed at each of an upper surface of a test body and a lower surface of a movement unit in a test handler for graphics chip according to the present invention.

Hereinafter, the loading unit 2, the unloading unit 3, the test unit 4, and the buffer unit 5 will be described in detail with reference to the accompanying drawings. Also, the graphics chip 10 to be tested in the test handler 1 for graphics chip according to the present invention is illustrated in FIG. 5.

Referring to FIGS. 1 and 2, the test handler 1 for graphics chip according to the present invention may include the loading unit 2.

Referring to FIGS. 1 and 2, the loading unit 2 performs a loading process on the graphics chip 10. The loading unit 2 may load the graphics chip 10, which is to be tested, into the buffer unit 5 to perform the loading process.

Referring to FIGS. 1 and 2, the loading unit 2 may include a loading stacker 21 and a loading picker 22.

A user tray 100 for storing the graphics chip 10 which is to be tested is disposed in the loading stacker 21. A plurality of graphics chips 10 may be put in the user tray 100. A plurality of user trays 100 may be stored in the loading stacker 21.

The loading picker 22 may pick up the graphics chip 10, which is to be tested, in the user tray 100 disposed in the loading stacker 21 to accommodate the graphics chip 10 into the buffer unit 5. The loading picker 22 may pick up the plurality of graphics chips 10 at a time. The loading picker 22 may move in a first-axis direction (an X-axis direction) and a second-axis direction (a Y-axis direction). The first-axis direction (the X-axis direction) and the second-axis direction (the Y-axis direction) may be axis directions perpendicular to each other. To this end, the test handler 1 for graphics chip according to the present invention may include a fixing rail 11 and a loading rail 23. The fixing rail 11 is disposed in the first-axis direction (the X-axis direction). The loading rail 23 is disposed in the second-axis direction (the Y-axis direction) to intersect with the fixing rail 11. The loading rail 23 and the fixing rail 11 may intersect to be perpendicular to each other. In this case, the loading rail 23 may move in the first-axis direction (the X-axis direction) along the fixing rail 11, and thus, the loading picker 22 may perform a reciprocating motion in the first-axis direction (the X-axis direction). Also, the loading picker 22 may perform a reciprocating motion in the second-axis direction (the Y-axis direction) along the loading rail 23. The loading picker 22 may be raised or lowered in a vertical direction. The vertical direction may be an axis direction perpendicular to each of the first-axis direction (the X-axis direction) and the second-axis direction (the Y-axis direction). Also, the loading picker 22 may include a rotation unit (not shown) having a rotation function. The rotation unit may rotate the buffer unit 5 in an accommodatable direction after the loading picker 22 picks up the graphics chip 10.

Referring to FIGS. 1 and 2, the unloading unit 3 performs an unloading process on the tested graphics chip 10. The unloading unit 3 may unload the tested graphics chip 10 from the buffer unit 5 to perform the unloading process. The unloading unit 3 may be disposed apart from the loading unit 2 in the first-axis direction (the X-axis direction).

The unloading unit 3 may include an unloading stacker 31, an unloading buffer 33, and an unloading picker 32.

The user tray 100 for storing the tested graphics chip 10 is disposed in the unloading stacker 31. The plurality of user trays 100 may be disposed in the unloading stacker 31. The tested graphics chip 10 may be put in the user trays 100 disposed at different positions by classes in the unloading stacker 31, based on the test result. In this case, the tested graphics chip 10 may be stored in a predetermined reference direction in the user tray 100 disposed in the unloading stacker 31.

The unloading buffer 33 is disposed between the unloading stacker 31 and the buffer unit 5. The unloading buffer 33 may include an unloading buffer groove (not shown) which accommodates the graphics chip 10 in the reference direction. The unloading buffer groove may temporarily accommodate the graphics chip 10 moved to the unloading stacker 31.

The unloading picker 32 transfers the tested graphics chip 10 to the user tray 100 of the unloading stacker 31 via the unloading buffer 33 from the buffer unit 5. The unloading picker 32 may pick up and transfer a plurality of graphics chips 10 at a time. The unloading picker 32 may move in the first-axis direction (the X-axis direction) and the second-axis direction (the Y-axis direction). To this end, the test handler 1 for graphics chip according to the present invention may include an unloading rail 34. The unloading rail 34 is disposed in the second-axis direction (the Y-axis direction) to intersect with the fixing rail 11. The unloading rail 34 may intersect to be perpendicular to the fixing rail 11. In this case, the unloading rail 34 may move in the first-axis direction (the X-axis direction) along the fixing rail 11, and thus, the unloading picker 32 may perform a reciprocating motion in the first-axis direction (the X-axis direction). Also, the unloading picker 32 may perform a reciprocating motion in the second-axis direction (the Y-axis direction) along the unloading rail 34. The unloading picker 32 may be raised or lowered in the vertical direction. The vertical direction may be an axis direction perpendicular to each of the first-axis direction (the X-axis direction) and the second-axis direction (the Y-axis direction). Also, the unloading picker 32 may include a rotation unit (not shown) having a rotation function. The rotation unit may rotate the graphics chip accommodated into the unloading buffer 33 after the unloading picker 32 picks up the graphics chip 10.

Therefore, the unloading picker 32 may selectively rotate the picked-up graphics chip 10 in the buffer unit 5 so that a direction of the graphics chip 10 matches the reference direction, and then, may accommodate the graphics chip 10 into the unloading buffer groove. Therefore, the test handler 1 for graphics chip according to the present invention may accommodate the graphics chip 10 into the unloading buffer 33 to be disposed in the same direction as the reference direction before accommodating the graphics chip 10 into the user tray 100 through the unloading picker 32. Therefore, the test handler 1 for graphics chip according to the present invention may accommodate the tested graphics chip 10 into the unloading buffer 33 in the reference direction, and thus, a process of storing the graphics chip 10 in the user tray 100 may be quickly performed. Also, the test handler 1 for graphics chip according to the present invention may move the tested graphics chip 10 from the buffer unit 5 to the unloading buffer 33 to accommodate the graphics chip 10. Therefore, the test handler 1 for graphics chip according to the present invention may prevent the tested graphics chip 10 from being neglected in the test unit 4, thereby preventing the delay of the test process.

Referring to FIGS. 1 and 2, the test handler 1 for graphics chip according to the present invention may include the test unit 4.

The test unit 4 tests the graphics chip 10 which is to be tested. That is, the test unit 4 may perform a test process on the graphics chip 10. The test unit 4 may connect the graphics chip 10 to the commercial graphics card 41 through the contact unit 42, and thus, the test process may be performed.

Figure 3:
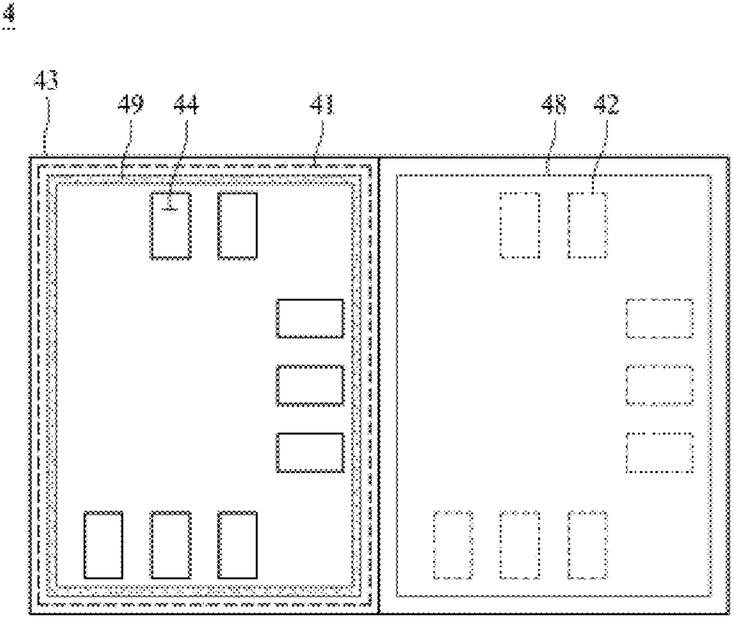
FIG. 3 is a schematic plan view of a test unit in a test handler for graphics chip according to the present invention.

Referring to FIGS. 1 to 3, the test unit 4 may include the commercial graphics card 41 and the contact unit 42.

The commercial graphics card 41 is the same as a practically used graphics card. The commercial graphics card 41 may have the same performance and function as those of a graphics card which is practically installed and used in a personal computer (PC) and the like. Accordingly, the test handler 1 for graphics chip according to the present invention may connect the graphics chip 10 to the commercial graphics card 41 to perform a test, and thus, may decrease a performance deviation which occurs in a case which tests a test graphics card replicated from the commercial graphics card 41. Also, a chip mount unit 411 connected to the graphics chip 10 may be provided in the commercial graphics card 41.

The contact unit 42 connects the commercial graphics card 41 to the graphics chip 10 which is to be tested. The contact unit 42 may press the graphics chip 10 to connect to the chip mount unit 411. The contact unit 42 may move in a vertical direction.

Referring to FIGS. 1 to 3, the test unit 4 may include a test body 43.

A test groove 44 is formed in the test body 43. The commercial graphics card 41 may be disposed in the test body 43. In this case, the commercial graphics card 41 may be disposed under the test body 43 with respect to the vertical direction. The test body 43 may be coupled to elements for performing the test process.

Referring to FIGS. 1 to 3, 5, and 6, the contact unit 42 may include a press member 421 and a movement limitation member 422. In this case, the test body 43 may include a stepped member 431.

The press member 421 is for pressing the graphics chip 10. The press member 421 may press the graphics chip 10 to connect to the chip mount unit 411. The press body 421 may move in a downward direction to press the graphics chip 10. The press member 421 may be formed of a material having stiffness which is higher than that of the test body 43.

The movement limitation member 422 protrudes from the press member 421. The movement limitation member 422 may protrude to a side surface of the press member 421. The movement limitation member 422 may have a height which is lower than the press member 421, with respect to a third-axis direction (a Z-axis direction) perpendicular to each of the first-axis direction (the X-axis direction) and the second-axis direction (the Y-axis direction). Here, the third-axis direction (the Z-axis direction) may denote a direction which is the same as the vertical direction. The movement limitation member 422 may be disposed to overlap the stepped member 431 and may limit a distance which enables the contact unit 42 to move toward the graphics chip 10. Therefore, the test handler 1 for graphics chip according to the present invention may be implemented so that the contact unit 42 intactly maintains a press force with which the contact unit 42 presses the graphics chip 10. Accordingly, by using the movement limitation member 422, the test handler 1 for graphics chip according to the present invention may prevent the contact unit 42 from pressing the graphics chip 10 with a strong press force, thereby preventing the graphics chip 10 from being damaged in a process where the contact unit 42 presses the graphics chip 10.

The stepped member 431 is for supporting the contact unit 42. The stepped member 431 may be formed in the test body 43. The stepped body 431 may be formed on an upper surface of the test body 43. The stepped member 431 may be disposed to at least partially overlap the movement limitation member 422 in the third-axis direction (the Z-axis direction).

Referring to FIGS. 1 to 3, the test unit 4 may include the test groove 44.

The graphics chip 10 is accommodated into the test groove 44. The test groove 44 may connect the accommodated graphics chip 10 to the commercial graphics card 41. In this case, the test groove 44 may connect the graphics chip 10 to the chip mount unit 411 provided in the commercial graphics card 41. The graphics chip 10 may be transferred from the buffer unit 5 to the test groove 44. The test groove 44 may be formed to be recessed in the test body 43.

Referring to FIGS. 1, 2, 5, and 7, the test unit 4 may include a test ball 45.

The test ball 45 is formed to pass through the test body 43 so as to connect with the test groove 44. The test ball 45 may connect the test groove 44 to the commercial graphics card 41. In this case, the chip mount unit 41 may be connected to the graphics chip 10 through the test ball 45, and test the graphics chip 10 may be tested.

Referring to FIGS. 1, 2, 8, and 7, the test unit 4 may include a test latch 46.

The test latch 46 is for supporting the graphics chip 10 accommodated into the test groove 44. The test latch 46 may support the graphics chip 10 after the graphics chip 10 is accommodated into the test groove 44. In this case, the contact unit 42 may connect the graphics chip 10, supported by the test latch 46, to the chip mount unit 411 and may then be spaced apart therefrom. In a case where the contact unit 42 is spaced apart from the graphics chip 10, the test latch 46 may support the graphics chip 10 so that the graphics chip 10 is maintained with being accommodated into the test groove 44. Therefore, the test handler 1 for graphics chip according to the present invention may prevent the contact unit 42 from deviating from the test groove 44 along with the graphics chip 10 in a case where the contact unit 42 is spaced apart from the graphics chip 10. Accordingly, the test handler 1 for graphics chip according to the present invention may prevent the graphics chip 10 from moving together with being attached on the contact unit 42 through the test latch 46, thereby preventing an abnormal operation which occurs in a process of picking up the tested graphics chip 10. Also, the test latch 46 may contact the graphics chips 10 at different positions and may support the graphics chips 10, so as to prevent interference with the commercial graphics card 41.

Referring to FIGS. 1 to 3, 10, and 11, the test unit 4 may include a movement unit 48.

The movement unit 48 moves the contact unit 42 between a contact position TP, at which the contact unit 42 is disposed on the test groove 44, and a standby position SP which is spaced apart from the contact position TP. The graphics chip 10 to be tested may be accommodated into the test groove 44, and then, the movement unit 48 may move from the standby position SP to the contact position TP. In this case, the contact unit 42 may press the graphics chip 10 to maintain a state where the graphics chip 10 contacts the chip mount unit 411 (illustrated in FIG. 4). On the other hand, a test on the graphics chip 10 may be completed, and then, the movement unit 48 may move from the contact position TP to the standby position SP. In this case, the graphics chip 10 may be picked up in a state where an upper side of the test groove 44 is opened and may move from the test unit 4 to the buffer unit 5. The movement unit 48 may move between the contact position TP and the standby position SP through a rail (not shown) coupled to the test unit 4.

Referring to FIGS. 1 to 3 and 12, the test unit 4 may include a sealing member 49.

The sealing member 49 is disposed between a lower surface of the movement unit 48 and an upper surface of the test body 43. The sealing member 49 may seal a region between the lower surface of the movement unit 48 and the upper surface of the test body 43 to surround all of the test grooves 44. Therefore, the test handler 1 for graphics chip according to the present invention may seal the test groove 44 from the outside while the contact unit 42 is pressing the graphics chip to connect to the chip mount unit 411. Accordingly, the test handler 1 for graphics chip according to the present invention may maintain the test groove 44 in a sealed state in a process of testing the graphics chip 10 through the sealing member 49, and thus, an accurate test process on the graphics chip 10 may be performed.

Referring to FIGS. 1 and 2, the test handler 1 for graphics chip according to the present invention may include the buffer unit 5.

The buffer unit 5 transfers the graphics chip 10 between the loading unit 2 and the test unit 4 and transfers the graphics chip 10 between the unloading unit 3 and the test unit 4. The buffer unit 5 may transfer the graphics chip 10, which is to be tested, from the loading unit 2 to the test unit 4. Also, the buffer unit 5 may transfer the tested graphics chip 10 from the test unit 4 to the unloading unit 3.

Figure 14:
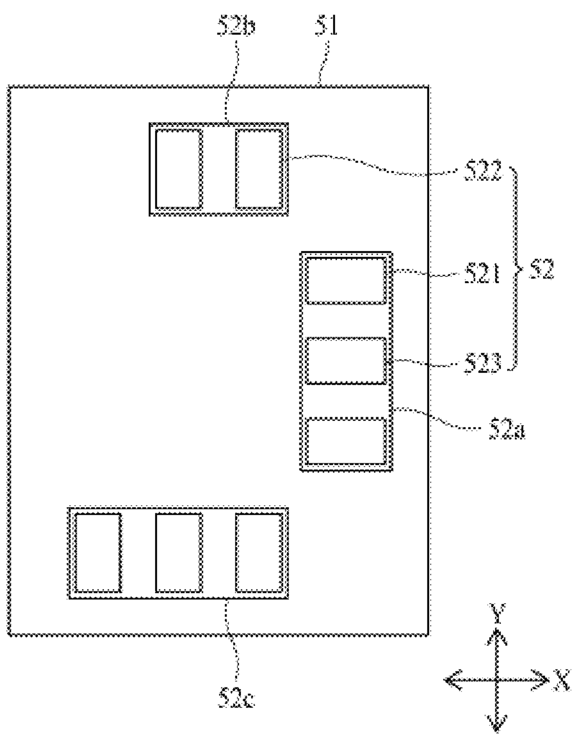
FIG. 14 is a schematic plan view of buffer grooves in a test handler for graphics chip according to the present invention.

Referring to FIGS. 1, 2, and 14, the buffer unit 5 may include a socket buffer 51 and a buffer groove 52.

The socket buffer 51 temporarily stores the graphics chip 10. A plurality of buffer grooves 52 for accommodating the graphics chip 10 may be formed in the socket buffer 51. Therefore, the socket buffer 51 may accommodate the graphics chip 10 into the buffer grooves 52, and thus, may temporarily store the graphics chip 10. The socket buffer 51 may move along the buffer rail 54. The buffer rail 54 may be disposed in the second-axis direction (the Y-axis direction). Accordingly, the socket buffer 51 may perform a reciprocating motion along the buffer rail 54 in the second-axis direction (the Y-axis direction). The socket buffer 51 may perform a reciprocating motion on the buffer rail 54 in a state where the graphics chip 10 is accommodated into the buffer grooves 52 and may move to a position close to the test unit 4.

Referring to FIGS. 1 and 2, the buffer unit 5 may include a test picker 53.

The test picker 53 is for transferring the graphics chip 10. The test picker 53 may sequentially or simultaneously pick up the graphics chips 10 accommodated into the buffer grooves 52 to accommodate into the test grooves 44. The test picker 53 may move the first-axis direction (the X-axis direction) and the second-axis direction (the Y-axis direction). To this end, the test handler 1 for graphics chip according to the present invention may include a test fixing rail 12 and a test rail 55. The test fixing rail 12 is disposed in the first-axis direction (the X-axis direction). The test rail 55 is disposed in the second-axis direction (the Y-axis direction) to intersect with the test fixing rail 12. The test rail 55 and the test fixing rail 12 may intersect to be perpendicular to each other. In this case, the test rail 55 may move in the first-axis direction (the X-axis direction) along the text fixing rail 12, and thus, the test picker 53 may perform a reciprocating motion in the first-axis direction (the X-axis direction). Also, the test picker 53 may perform a reciprocating motion in the second-axis direction (the Y-axis direction) along the test rail 55. The test picker 53 may be raised or lowered in a vertical direction. Therefore, the graphics chip 10 may be disposed at a position close to the test grooves 44 into which the graphics chips 10 are to be accommodated through the socket buffer 51, and thus, a movement distance of the test picker 53 may be minimized. Accordingly, the test handler 1 for graphics chip according to the present invention may allow the graphics chip 10 to stand by through the socket buffer 51, and thus, a process time for accommodating the graphics chip 10 into the test grooves 44 may be shortened.

Referring to FIGS. 1, 2, 8, 9, and 14, the test picker 53 may include an opening/closing unit 531.

The opening/closing unit 531 is for pressing a latch button 47. The opening/closing unit 531 may be implemented to press the latch button 47 as the test picker 53 is raised or lowered. On the other hand, the opening/closing unit 531 may be implemented to be spaced apart from the latch button 47 as the test picketer 53 is raised. Therefore, when the opening/closing unit 531 presses the latch button 47 as the test picker 53 is lowered, the test latch 46 may rotate to an opening position OP which opens the test groove 44. Also, when the opening/closing unit 531 is spaced apart from the latch button 47 as the test picker 53 is raised, the test latch 46 may rotate to a closing position CP which closes the test groove 44. Therefore, in the test handler 1 for graphics chip according to the present invention, when the test latch 46 moves to the opening position OP, the graphics chip 10 picked up by the test picker 53 may be accommodated into the test groove 44. Also, in the test handler 1 for graphics chip according to the present invention, when the test latch 46 moves to the closing position CP, the graphics chip 10 may be picked up by the test picker 53 and may thus deviate from the test groove 44. The opening/closing unit 531 may be coupled to the test picker 53 in a downward direction of the test picker 53.

Hereinafter, an embodiment where the chip mount unit 411, the test groove 44, and the buffer groove 52 are implemented in plurality in the test handler 1 for graphics chip according to the present invention will be described in detail.

Referring to FIGS. 1 to 4 and 13, the test handler 1 for graphics chip according to the present invention, the commercial graphics card 41 may include a plurality of chip mount units 411, and the test unit 4 may include a plurality of test grooves 44. In this case, the chip mount units 411 and the test grooves 44 may be disposed based on the same layout. Therefore, the test handler 1 for graphics chip according to the present invention may accommodate the graphics chips 10 into the test grooves 44 corresponding to the chip mount unit 411 to perform a test on the graphics chips 10. Accordingly, the test handler 1 for graphics chip according to the present invention may perform a test on the graphics chip 10 in the same environment as a practically used environment by using the chip mount units 411 and the test grooves 44.

Figure 4:
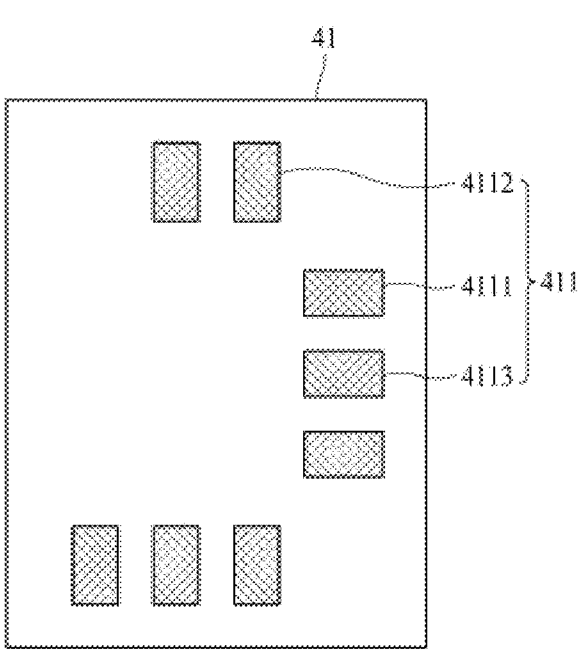
FIG. 4 is a schematic plan view of a commercial graphics card installed in a test unit in a test handler for graphics chip according to the present invention.
Figure 13:
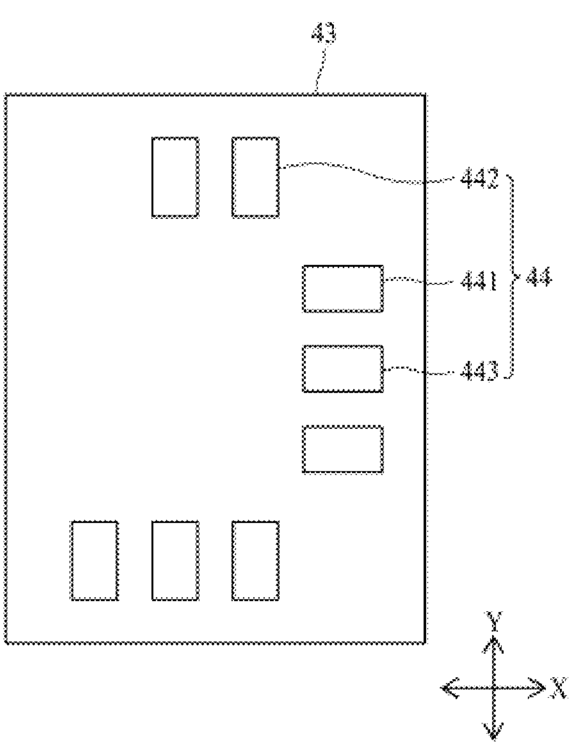
FIG. 13 is a schematic plan view of test grooves in a test handler for graphics chip according to the present invention.

In detail, referring to FIGS. 4 and 13, in the test handler 1 for graphics chip according to the present invention, the chip mount unit 411 may include a first chip mount unit 4111 and a second chip mount unit 4112, and the test groove 44 may include a first test groove 441 and a second test groove 442.

The first chip mount unit 4111 of the chip mount units 411 and the second chip mount unit 4112 of the chip mount units 411 may be disposed in different directions. At this time, the first test groove 441 corresponding to the first chip mount unit 4111 among the test grooves 44 may be disposed in the same direction as the first chip mount unit 4111. Also, the second test groove 442 corresponding to the second chip mount unit 4112 among the test grooves 44 may be disposed in the same direction as the second chip mount unit 4112.

Referring to FIGS. 4 and 13, in the test handler 1 for graphics chip according to the present invention, the chip mount unit 411 may include a third chip mount unit 4113, and the test groove 44 may include a third test groove 443.

The first chip mount unit 4111 of the chip mount units 411 and the second chip mount unit 4112 of the chip mount units 411 may be spaced apart from each other by a first distance. The second chip mount unit 4112 and the third chip mount unit 4113 of the chip mount units 411 may be spaced apart from each other by a second distance which differs from the first distance. At this time, the first test groove 441 corresponding to the first chip mount unit 4111 among the test grooves 44 and the second test groove 442 corresponding to the second chip mount unit 4112 among the test grooves 44 may be spaced apart from each other by the first distance. Also, the second test groove 442 and the third test groove 443 corresponding to the third chip mount unit 4113 among the test grooves 44 may be spaced apart from each other by the second distance.

Referring to FIGS. 1, 2, and 14, in the test handler 1 for graphics chip according to the present invention, the buffer unit 5 may include a plurality of buffer grooves 52. In this case, the buffer grooves 52 may be arranged based on the layout. Therefore, in the test handler 1 for graphics chip according to the present invention, the buffer grooves 52 may previously accommodate the graphics chip 10, based on the layout, and thus, the graphics chip 10 may be accommodated into the test grooves 44 by using the test picker 53 even without separate interval adjustment. Accordingly, in the test handler 1 for graphics chip according to the present invention, the graphics chips 10 may be quickly accommodated into the test grooves 44 through the buffer grooves 52, and thus, a time of the test process may be reduced.

In detail, referring to FIG. 14, in the test handler 1 for graphics chip according to the present invention, the buffer unit 5 may include a first buffer groove 521 and a second buffer groove 522.

The first buffer groove 521 corresponding to the first chip mount unit 4111 among the buffer grooves 52 may be disposed in the same direction as the first chip mount unit 4111. Also, the second buffer groove 522 corresponding to the second chip mount unit 4112 among the buffer grooves 52 may be disposed in the same direction as the second chip mount unit 4112.

Referring to FIG. 14, in the test handler 1 for graphics chip according to the present invention, the buffer groove 52 may include a third buffer groove 523.

The first buffer groove 521 corresponding to the first chip mount unit 4111 among the buffer grooves 52 and the second buffer groove 522 corresponding to the second chip mount unit 4112 among the buffer grooves 52 may be spaced apart from each other by the first distance. The second buffer groove 522 and the third buffer groove 523 corresponding to the third chip mount unit 4113 among the buffer grooves 52 may be spaced apart from each other by the second distance.

Moreover, referring to FIG. 14, the buffer groove 52 may include a first buffer group **52*a*, a second buffer group 52*b*, and a third buffer group 52*c*. The first buffer group 52*a*, the second buffer group 52*b*, and the third buffer group 52*c* may each include two or more buffer grooves 52**.

The first buffer group **52*a* may be disposed in a direction which differs from a direction in which the second buffer group 52*b* or the third buffer group 52*c* is disposed. In this case, the second buffer group 52*b* may be disposed apart from the first buffer group 52*a*. Also, the third buffer group 52*c* may be disposed apart from the first buffer group 52*a* in the second-axis direction (the Y-axis direction). In this case, the third buffer group 52*c* may be disposed to face the second buffer group 52*b* in the second-axis direction (the Y-axis direction). The third buffer group 52*c* may be disposed apart from the first buffer group 52*a* in a direction which differs from a direction in which the second buffer group 52*b* is spaced apart from the first buffer group 52*a*. Also, the chip mount units 411 and the test grooves 44 may be implemented to approximately match the buffer grooves 52**, and thus, their detailed descriptions are omitted.

Although not shown, a plurality of sets each including buffer grooves arranged based on the layout may be disposed in the socket buffer 51. In this case, each of the plurality of sets may include the first buffer group **52*a*, the second buffer group 52*b*, and the third buffer group 52*c*. Therefore, the test handler 1 for graphics chip according to the present invention may be implemented so that the graphics chips 10 are simultaneously accommodated into the plurality of sets through the socket buffer 51. Accordingly, in the test handler 1 for graphics chip according to the present invention, the number of graphics chips 10** capable of testing per unit time may increase.

Moreover, referring to FIGS. 1 to 14, in the test handler 1 for graphics chip according to the present invention, the graphics chips 10 may be transferred, stored, and tested in the following order. In the test handler 1 for graphics chip according to the present invention, the transfer, storage, and test of a plurality of graphics chips 10 may be simultaneously performed, but a process of transferring, storing, and testing one graphics chip 10 will be sequentially described below.

First, the graphics chip 10 may be stored in the loading stacker 21 with being accommodated into the user tray 100. In this case, a plurality of graphics chip 10 may be accommodated into the user tray 100.

Subsequently, the graphics chip 10 may be picked up by the loading picker 22 and may be transferred from the user tray 100, disposed in the loading stacker 21, to the buffer groove 52 formed in the socket buffer 51. The graphics chip 10 may move in the first-axis direction (the X-axis direction) or the second-axis direction (the Y-axis direction) through the loading rail 23 and may move to the buffer groove 52. In this case, the graphics chip 10 may be accommodated into the buffer groove 52 which is disposed based on the same layout as the chip mount unit 411.

Subsequently, the graphics chip 10 may move along with the socket buffer 51 in the second-axis direction (the Y-axis direction) with being accommodated into the buffer groove 52. The socket buffer 51 may transfer the graphics chip 10 to a position close to the test unit 4. In this case, the graphics chip 10 may be transferred to a position close to the test unit 4 where the graphics chip 10 is not provided as a test on the graphics chip 10 is completed through the socket buffer 51.

Subsequently, the graphics chip 10 may be picked up by the test picker 53 and may be transferred from the socket buffer 51 to the test body 43. In this case, the graphics chip

10 may be transferred from the buffer groove 52, formed in the socket buffer 51, to the test groove 44 formed in the test body 43 and may be accommodated into the test groove 44. In this case, the graphics chip 10 may be supported by the test latch 46 moved to the closing position CP with being accommodated into the test groove 44.

Subsequently, the graphics chip 10 may be pressed by the contact unit 42 and may be connected to the chip mount unit 411 formed in the commercial graphics card 41. In this case, the movement unit 48 may move from the standby position SP to the contact position TP, and then, the contact unit 42 may move in the vertical direction to press the graphics chip 10.

Subsequently, after a test on the graphics chip 10 is completed, the contact unit 42 may be spaced apart from the graphics chip 10. In this case, the movement unit 48 may move from the contact position TP to the standby position SP, and thus, the contact unit 42 may be spaced apart from the graphics chip 10.

Subsequently, the graphics chip 10 may be picked up by the test picker 53 and may be transferred from the test body 43 to the socket buffer 51. In this case, the graphics chip 10 may be transferred from the test groove 44, formed in the test body 43, to the buffer groove 52 formed in the socket buffer 51 and may be accommodated into the buffer groove 52. In this case, the graphics chip 10 may be spaced apart from the test latch 46 moved to the opening position OP.

Subsequently, the graphics chip 10 may be picked up by the unloading picker 32, may be transferred from the buffer groove 52, formed in the socket buffer 51, to an unloading buffer groove formed in the unloading buffer 33, and may be accommodated into the unloading buffer groove. In this case, the graphics chip 10 may be accommodated in the reference direction.

Finally, the graphics chip 10 may be picked up by the unloading picker 32 and may be transferred from the unloading buffer groove to the user tray 100 disposed in the unloading stacker. In this case, the graphics chips 10 may be classified by classes, based on a test result, and may be stored in the user tray 100.

According to the present invention, the following effects may be realized.

The present invention may perform a test on a graphics chip by using the contact unit and the commercial graphics card which is the same as a practically used graphics card. Accordingly, the present invention may perform a test in the same environment as a practically used environment, and thus, may decrease a performance deviation between the performance of a graphics chip based on a test result and the performance of a graphics chip in a case where a graphics chip is equipped in a commercial graphics card and used.

The present invention described above are not limited to the above-described embodiments and the accompanying drawings and those skilled in the art will clearly appreciate that various modifications, deformations, and substitutions are possible without departing from the scope and spirit of the invention.

What is claimed is:

1. A test handler for graphics chips, the test handler comprising:

a loading unit configured to perform a loading process of loading a graphics chip which is to be tested;

a test unit configured to test the graphics chip which is to be tested;

an unloading unit configured to perform an unloading process of unloading the tested graphics chip; and a buffer unit configured to transfer the graphics chip between the loading unit and the test unit and to transfer the graphics chip between the unloading unit and the test unit, wherein the test unit comprises a graphics card, a contact unit connecting the graphics card to the graphics chip which is to be tested, a test groove into which the graphics chip is accommodated, a test body where the test groove is formed, and a test ball formed to pass through the test body so as to connect with the test groove, and wherein the graphics card comprises a chip mount unit directly connected to the graphics chip through the test ball to test the graphics chip.

2. The test handler of claim 1, wherein the graphics card comprises a plurality of chip mount units, the test unit comprises a plurality of test grooves, and the chip mount units and the test grooves are disposed based on a layout.

3. The test handler of claim 2, wherein a first chip mount unit of the chip mount units and a second chip mount unit of the chip mount units are disposed in different directions, a first test groove corresponding to the first chip mount unit among the test grooves is disposed in a same direction as the first chip mount unit, and a second test groove corresponding to the second chip mount unit among the test grooves is disposed in a same direction as the second chip mount unit.

4. The test handler of claim 3, wherein the buffer unit comprises a plurality of buffer grooves for accommodating the graphics chip and a socket buffer where the buffer grooves are formed, a first buffer groove corresponding to the first chip mount unit among the buffer grooves is disposed in a same direction as the first chip mount unit, and a second buffer groove corresponding to the second chip mount unit among the buffer grooves is disposed in a same direction as the second chip mount unit.

5. The test handler of claim 2, wherein a first chip mount unit of the chip mount units and a second chip mount unit of the chip mount units are spaced apart from each other by a first distance, the second chip mount unit and a third chip mount unit of the chip mount units are spaced apart from each other by a second distance which differs from the first distance, a first test groove corresponding to the first chip mount unit among the test grooves and a second test groove corresponding to the second chip mount unit among the test grooves are spaced apart from each other by the first distance, and the second test groove and a third test groove corresponding to the third chip mount unit among the test grooves are spaced apart from each other by the second distance.

6. The test handler of claim 5, wherein the buffer unit comprises a plurality of buffer grooves for accommodating the graphics chip and a socket buffer where the buffer grooves are formed, a first buffer groove corresponding to the first chip mount unit among the buffer grooves and a second buffer groove corresponding to the second chip mount unit among the buffer grooves are spaced apart from each other by the first distance, and the second buffer groove and a third buffer groove corresponding to the third chip mount unit among the buffer grooves are spaced apart from each other by the second distance.

7. The test handler of claim 2, wherein the buffer unit comprises a plurality of buffer grooves for accommodating the graphics chip and a socket buffer where the buffer grooves are formed, and the buffer grooves are disposed based on the layout.

8. The test handler of claim 7, wherein a plurality of sets each including buffer grooves disposed based on the layout are disposed in the socket buffer.

9. The test handler of claim 1, wherein the test unit comprises a test latch for supporting the graphics chip accommodated into the test groove, the contact unit connects the graphics chip, supported by the test latch, to the chip mount unit and is then spaced apart therefrom, and in a case where the contact unit is spaced apart from the graphics chip, the test latch supports the graphics chip so that the graphics chip is maintained with being accommodated into the test groove.

10. The test handler of claim 1, wherein the test unit comprises a test latch for supporting the graphics chip accommodated into the test groove and a latch button for rotating the test latch, the buffer unit comprises a test picker for transferring the graphics chip, the test picker comprising an opening/closing unit for pressing the latch button, and when the opening/closing unit presses the latch button as the test picker is lowered, the test latch rotates to an opening position opening the test groove, and when the opening/closing unit is spaced apart from the latch button as the test picker is raised, the test latch rotates to a closing position closing the test groove.

11. The test handler of claim 1, wherein the test unit comprises a movement unit configured to move moving the contact unit between a contact position, at which the contact unit is disposed on the test groove, and a standby position spaced apart from the contact position.

12. The test handler of claim 11, wherein the test unit comprises a sealing member disposed between a lower surface of the movement unit and an upper surface of the test body to seal a region between the lower surface of the movement unit and the upper surface of the test body so as to surround all of the test grooves.

13. The test handler of claim 1, wherein the test body comprises a stepped member for supporting the contact unit, the contact unit comprises a press member for pressing the graphics chip and a movement limitation member protruding from the press member, and the movement limitation member is disposed to overlap the stepped member and limits a distance enabling the contact unit to move toward the graphics chip.

14. The test handler of claim 1, wherein the unloading unit comprises:

an unloading stacker where a user tray for storing the tested graphics chip is disposed;

an unloading buffer disposed between the buffer unit and the unloading stacker; and an unloading picker configured to transfer the tested graphics chip to the user tray of the unloading stacker via the unloading buffer from the buffer unit, the tested graphics chip is stored in a predetermined reference direction in the user tray disposed in the unloading stacker, the unloading buffer comprises an unloading buffer groove accommodating the graphics chip in the reference direction, and the unloading picker selectively rotates the graphics chip picked up in the buffer unit so that a direction of the graphics chip matches the reference direction, and then, accommodates the graphics chip into the unloading buffer groove.

15. A test handler for graphics chips, the test handler comprising:

a loading unit configured to perform a loading process of loading a graphics chip which is to be tested;

a test unit configured to test the graphics chip which is to be tested;

an unloading unit configured to perform an unloading process of unloading the tested graphics chip; and a buffer unit configured to transfer the graphics chip between the loading unit and the test unit and to transfer the graphics chip between the unloading unit and the test unit, wherein the test unit comprises a graphics card, a contact unit connecting the graphics card to the graphics chip which is to be tested, a test groove into which the graphics chip is accommodated, and a test body where the test groove is formed, wherein the graphics card comprises a chip mount unit connected to the graphics chip accommodated into the test groove, and wherein the test unit comprises a movement unit configured to move the contact unit between a contact position, at which the contact unit is disposed on the test groove, and a standby position spaced apart from the contact position.

16. The test handler of claim 15, wherein the test unit comprises a sealing member disposed between a lower surface of the movement unit and an upper surface of the test body to seal a region between the lower surface of the movement unit and the upper surface of the test body so as to surround all of the test grooves.

17. A test handler for graphics chips, the test handler comprising:

a loading unit configured to perform a loading process of loading a graphics chip which is to be tested;

a test unit configured to test the graphics chip which is to be tested;

an unloading unit configured to perform an unloading process of unloading the tested graphics chip; and a buffer unit configured to transfer the graphics chip between the loading unit and the test unit and to transfer the graphics chip between the unloading unit and the test unit, wherein the test unit comprises a graphics card, a contact unit connecting the graphics card to the graphics chip which is to be tested, a test groove into which the graphics chip is accommodated, a test body where the test groove is formed, and a test latch for supporting the graphics chip accommodated into the test groove, and wherein the graphics card comprises a chip mount unit connected to the graphics chip accommodated into the test groove, and wherein the contact unit connects the graphics chip, supported by the test latch, to the chip mount unit and is then spaced apart therefrom, and in a case where the contact unit is spaced apart from the graphics chip, the test latch supports the graphics chip so that the graphics chip is maintained with being accommodated into the test groove.

* * * * *